United States Patent Office 2,951,000
Patented Aug. 30, 1960

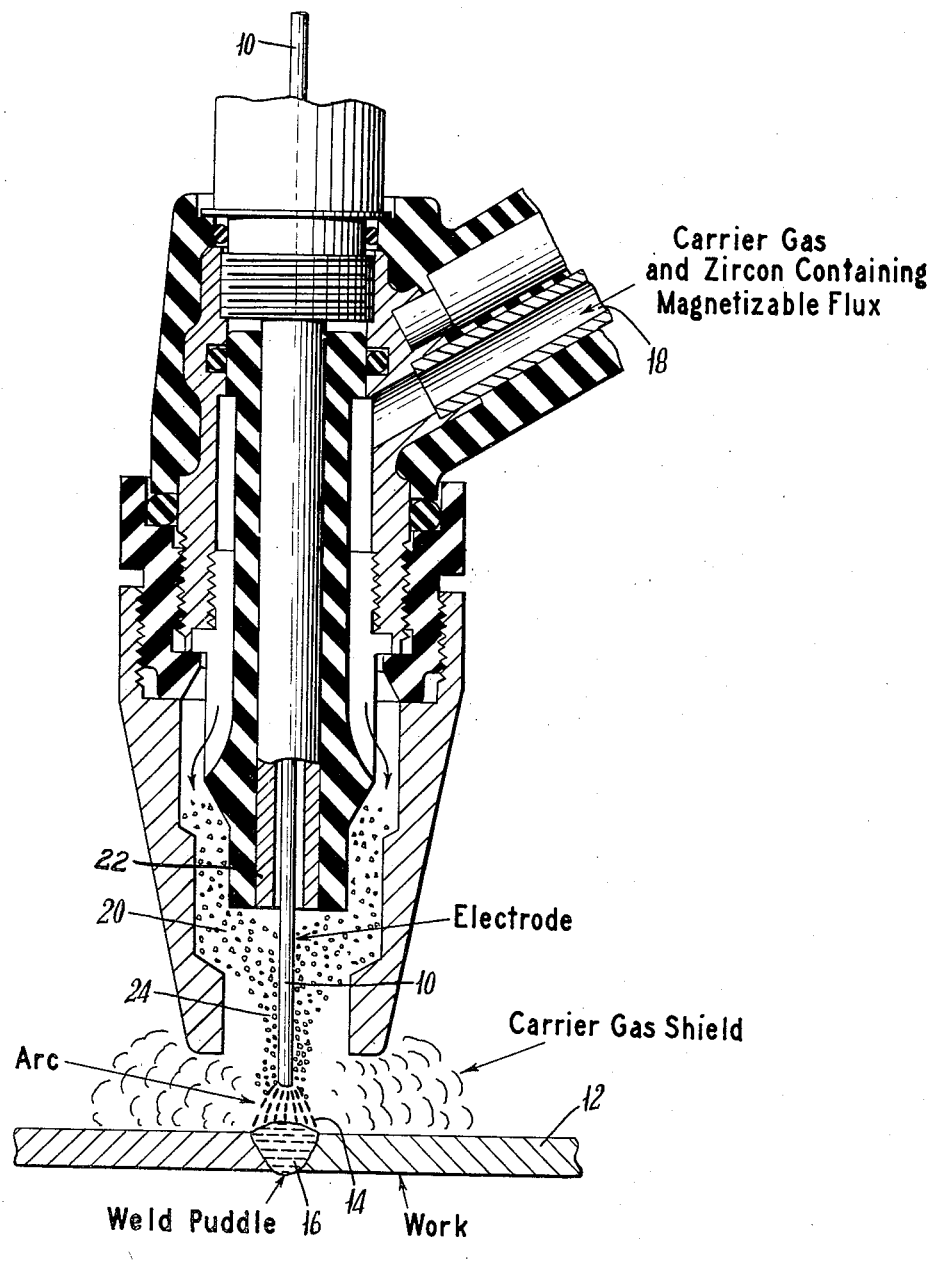

2,951,000

WELDING COMPOSITION

Harry E. Kennedy, Berkeley, Calif., and Gerard E. Claussen, Summit, N.J., assignors to Union Carbide Corporation, a corporation of New York Filed Apr. 26, 1957, Ser. No. 655,314

4 Claims. (Cl. 148—26)

The present invention concerns a novel welding composition suitable for metal arc welding based on the use of powdered magnetic fluxes that are conveyed to the electrode either by gravity or a carrier gas, and which adhere to the electrode as a result of their magnetic permeability and are thus carried to and melted at the arc zone.

Continued increase in the commercial use of metal arc welding, as disclosed by Harry E. Kennedy in his application filed January 14, 1955, Serial No. 481,906, now abandoned, and superseded by continuation application filed June 7, 1957, Serial No. 664,256, for example, has prompted the exploration of less expensive types of flux which would not only have sufficient magnetic permeability to be applicable to such welding, but which would also be suitable for producing welds of acceptable impact strength and mechanical properties.

According to the present invention such features have been obtained in novel fluxes which contain a considerable quantity of zircon sand and/or periclase (magnesia), both of which constituents are plentiful in supply and relatively inexpensive. The broad range of constituents which are present in our zircon-containing fluxes is set forth below. Also given are three specific welding compositions according to the invention.

The general method of preparing powdered magnetizable welding fluxes is described in the copending application referred to hereinabove. According to this method, the flux components such as fluorides, slag forming ingredients, deoxidizers and alloying ingredients are ground to a uniform size and combined, the magnetic component is added, and the resulting mixture is bonded with sodium and/or potassium silicate. The bonded mixture is then dried at about 500° to 600° F. and granulated to the proper mesh size for use. This general method of combining the ingredients and bonding them by means of a silicate is used to prepare the fluxes of the present invention.

| Constituent | Broad Range, Percent | Percent by Weight | | |
|---|---|---|---|---|
| | | "G" | "R" | "E" |
| Zircon Sand | 10–40 | 17.3 | 33.4 | 10.2 |
| Periclase (Magnesia) | 10–25 | 16.1 | | 10.2 |
| Rutile | 10–35 | 22.9 | 22.9 | 22.7 |
| Cryolite | 2–8 | 4.4 | 4.4 | 3.9 |
| Silica | 0–20 | | | 10.2 |
| Alumina | 0–20 | | | 3.9 |
| Ferro-alloy (FeSi, FeAl, FeTi, FeZr) | 0–8 | 2.4 | 2.4 | 2.4 |
| Silicomanganese | 0–16 | 10.9 | 10.9 | 11.0 |
| Magnetite | 0–20 | 7.2 | 7.3 | 7.1 |
| Iron Powder | 10–30 | 16.9 | 16.9 | 16.5 |
| Sodium Silicate Binder | 1–4 | 1.9 | 1.8 | 1.9 |

In the drawing, the single figure is a view in cross section of an electric arc welding torch in operation, illustrating the invention.

As shown, a metal electrode 10 in the form of a wire is fed at a rate of at least 90 inches per minute toward the work 12 to be welded, as an electric arc 14 is energized between the end of such electrode and the work, of sufficient intensity to fuse such electrode and transfer molten metal therefrom to the adjacent area of the work, forming a weld puddle 16 which solidifies when the arc is moved away. A suitable powdered flux-carrying gas such as air or $CO_2$ is fed to the torch through an inlet 18 and distributed in an annular stream 20 about the end portion of the electrode 10 as the latter emerges from a tubular electrical contactor-guide 22 in the torch. The powdered flux is attracted to the current-carrying wire and forms a covering 24 thereon that is carried therewith to the arc.

*Typical examples*

I

Twenty-layer butt welds were produced by welding with the powdered flux designated above as Type "G" in ¾-inch thick mild steel plates at 380 amperes, 29 volts, using a ³⁄₃₂-inch metal electrode composed of .10 C, .28 Mn, .01 Si and the balance mainly iron. The ratio of flux-to-electrode was 0.57. Izod impact specimens cut from the bottom two-thirds and top two-thirds of the welds had the following values:

| | Bottom ⅔ | Top ⅔ |
|---|---|---|
| | Ft.-lb. | Ft.-lb. |
| Room temperature | 84 | 74 |
| −20° F | 71, 62 | 52, 41 |

II

A seven-layer butt joint weld was made in ½-inch thick mild steel plate using powdered flux "E" above. The weld was produced at 400 amperes and 31 volts. A ³⁄₃₂-inch electrode as in Example I was employed, and $CO_2$ gas, fed at a rate of 35 cubic feet per hour, was utilized as the carrier gas. The ratio of flux-to-electrode was 0.48.

Tensile specimens from such weld, when tested, provided the following results:

Yield point _____p.s.i._ 68,200
Tensile strength _____p.s.i._ 79,100
Elongation _____percent__ 31.3
Reduction of area _____do____ 68.6

The present invention provides relatively low-cost flux producing satisfactory welding behavior and excellent mechanical properties.

What is claimed is:

1. A powdered magnetizable welding flux composed by weight of 17.3% zircon sand, 16.1% periclase (magnesia), 22.9% rutile, 4.4% cryolite, 2.4% ferro-alloy, 10.9% silicomanganese, 7.2% magnetite, 16.9% iron powder, and 1.9% sodium silicate.

2. A powdered magnetizable welding flux composed by weight of 33.4% zircon sand, 22.9% rutile, 4.4% cryolite, 2.4% ferro-alloy, 10.9% silicomanganese, 7.3% magnetite, 16.9% iron powder, and 1.8% sodium silicate.

3. A powdered magnetizable welding flux composed by weight of 10.2% zircon sand, 10.2% periclase (magnesia), 22.7% rutile, 3.9% cryolite, 10.2% silica, 3.9% alumina, 2.4% ferro-alloy, 11.0% silicomanganese, 7.1% magnetite, 16.5% iron powder, and 1.9% sodium silicate.

4. A powdered magnetizable welding flux composed by weight of 10–40% zircon sand, 10–25% periclase (magnesia), 10–35% rutile, 10–30% iron powder and the remainder of the flux consisting essentially of materials selected from the group consisting of cryolite, silica, alumina, ferro-alloy, silicomanganese, magnetite and sodium silicate.

(References on following page)

References Cited in the file of this patent

UNITED STATES PATENTS

| | | |
|---|---|---|
| 1,852,021 | Miller | Apr. 5, 1932 |
| 2,060,681 | Miller et al. | Nov. 10, 1936 |
| 2,220,954 | Chapman | Nov. 12, 1940 |
| 2,474,787 | Landis et al. | June 28, 1949 |
| 2,491,593 | Van der Willigen | Dec. 20, 1949 |
| 2,544,334 | Linnert | Mar. 6, 1951 |
| 2,719,801 | Stringham et al. | Oct. 4, 1955 |
| 2,803,740 | Hyink | Aug. 20, 1957 |

FOREIGN PATENTS

| | | |
|---|---|---|
| 753,592 | Great Britain | July 25, 1956 |